United States Patent
King et al.

(10) Patent No.: US 11,075,394 B2
(45) Date of Patent: Jul. 27, 2021

(54) APPARATUS AND METHOD FOR HIGH EFFICIENCY OPERATION OF FUEL CELL SYSTEMS

(71) Applicant: General Electric Company, Schenectady, NY (US)

(72) Inventors: Robert Dean King, Schenectady, NY (US); Timothy Gerard Richter, Wynantskill, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 241 days.

(21) Appl. No.: 16/034,817

(22) Filed: Jul. 13, 2018

(65) Prior Publication Data

US 2018/0323450 A1 Nov. 8, 2018

Related U.S. Application Data

(63) Continuation of application No. 14/867,652, filed on Sep. 28, 2015, now Pat. No. 10,056,630, which is a
(Continued)

(51) Int. Cl.
| | |
|---|---|
| *H01M 8/18* | (2006.01) |
| *H01M 8/04828* | (2016.01) |
| *H01M 8/04537* | (2016.01) |
| *H01M 16/00* | (2006.01) |
| *H02J 7/34* | (2006.01) |

(Continued)

(52) U.S. Cl.
CPC .......... *H01M 8/0494* (2013.01); *B60L 58/40* (2019.02); *H01M 8/04619* (2013.01);
(Continued)

(58) Field of Classification Search
CPC ............. H01M 8/04828; H01M 16/00; H01M 8/04619; H01M 8/04947; H01M 8/18;
(Continued)

(56) References Cited

U.S. PATENT DOCUMENTS

| | | |
|---|---|---|
| 5,373,195 A | 12/1994 | De Doncker et al. |
| 5,710,699 A | 1/1998 | King et al. |

(Continued)

FOREIGN PATENT DOCUMENTS

| | | |
|---|---|---|
| CN | 2756489 Y | 2/2006 |
| DE | 19962681 A1 | 6/2001 |

(Continued)

OTHER PUBLICATIONS

Office Action for corresponding DE Application 102009044684.2, dated Jan. 22, 2020.

*Primary Examiner* — Alexander Usyatinsky
(74) *Attorney, Agent, or Firm* — Meagher Emanuel Laks Goldberg & Liao, LLP

(57) ABSTRACT

A drive circuit comprising a DC bus configured to supply power to a load, a first fuel cell coupled to the DC bus and configured to provide a first power output to the DC bus, and a second fuel cell coupled to the DC bus and configured to provide a second power output to the DC bus supplemental to the first fuel cell. The drive circuit further includes an energy storage device coupled to the DC bus and configured to receive energy from the DC bus when a combined output of the first and second fuel cells is greater than a power demand from a load, and provide energy to the DC bus when the combined output of the first and second fuel cells is less than the power demand from the load.

11 Claims, 8 Drawing Sheets

Related U.S. Application Data continuation of application No. 13/937,643, filed on Jul. 9, 2013, now Pat. No. 9,148,085, which is a continuation of application No. 12/326,171, filed on Dec. 2, 2008, now Pat. No. 8,486,570.

(51) Int. Cl.
   *B60L 58/40* (2019.01)
   *H02P 27/06* (2006.01)

(52) U.S. Cl.
   CPC ......... *H01M 8/04947* (2013.01); *H01M 8/18* (2013.01); *H01M 16/003* (2013.01); *H01M 16/006* (2013.01); *H02J 7/34* (2013.01); *H02P 27/06* (2013.01); *H01M 2250/20* (2013.01); *H02J 2300/30* (2020.01); *Y02E 60/50* (2013.01); *Y02P 70/50* (2015.11); *Y02P 90/40* (2015.11); *Y02T 90/40* (2013.01); *Y10T 29/49002* (2015.01)

(58) Field of Classification Search
   CPC ............ H01M 16/006; H01M 8/0494; H01M 16/003; H01M 2250/20; B60L 11/18; B60L 58/40; H02P 27/06; Y02T 90/40; Y10T 307/511; Y10T 307/549; Y10T 307/505; Y10T 29/49002; Y10T 307/50; Y02E 60/50; Y02P 70/50; Y02P 90/40; H02J 2300/30; H02J 7/34
   See application file for complete search history.

(56) References Cited

U.S. PATENT DOCUMENTS

| | | | |
|---|---|---|---|
| 5,796,175 A * | 8/1998 | Itoh | B60L 50/51 307/10.1 |
| 5,903,449 A * | 5/1999 | Garrigan | H02J 7/34 363/41 |
| 5,929,594 A | 7/1999 | Nonobe et al. | |
| 6,255,008 B1 * | 7/2001 | Iwase | B60L 58/30 429/9 |
| 6,331,365 B1 * | 12/2001 | King | B60L 50/51 429/9 |
| 6,354,671 B1 | 3/2002 | Feldmann et al. | |
| 6,380,638 B1 | 4/2002 | Bitsche | |
| 6,777,909 B1 | 8/2004 | Aberle et al. | |
| 7,049,792 B2 | 5/2006 | King | |
| 7,583,050 B2 | 9/2009 | Sugiura et al. | |
| 7,740,092 B2 | 6/2010 | Bender | |
| 8,054,048 B2 | 11/2011 | Woody et al. | |
| 8,217,620 B2 | 7/2012 | Hanssen et al. | |
| 9,148,185 B2 | 9/2015 | Taya et al. | |
| 2003/0077494 A1 | 4/2003 | Aberle | |
| 2004/0126635 A1 * | 7/2004 | Pearson | H01M 8/04089 429/430 |
| 2005/0233192 A1 | 10/2005 | Ishikawa et al. | |
| 2006/0012248 A1 | 1/2006 | Matsushita et al. | |
| 2006/0222910 A1 | 10/2006 | Aoyagi et al. | |
| 2006/0250902 A1 | 11/2006 | Bender et al. | |
| 2007/0069683 A1 | 3/2007 | Pant et al. | |
| 2007/0275276 A1 | 11/2007 | Saeki et al. | |
| 2008/0075988 A1 | 3/2008 | Suzuki | |
| 2010/0090626 A1 * | 4/2010 | King | B60L 7/16 318/376 |
| 2015/0303434 A1 * | 10/2015 | Holtappels | H01M 10/441 320/136 |

FOREIGN PATENT DOCUMENTS

| | | |
|---|---|---|
| DE | 10332337 A1 | 2/2005 |
| DE | 102005016300 A1 | 10/2006 |
| WO | 22005004261 A2 | 1/2005 |

* cited by examiner ly to, U.S. patent application Ser. No. 12/326,
APPARATUS AND METHOD FOR HIGH EFFICIENCY OPERATION OF FUEL CELL SYSTEMS

CROSS-REFERENCE TO RELATED APPLICATION

The present application is a non-provisional of, and claims priority to, U.S. patent application Ser. No. 12/326, 171, filed Dec. 2, 2008, the disclosure of which is incorporated herein by reference.

BACKGROUND OF THE INVENTION

Embodiments of the invention relate generally to systems that derive their power from fuel cells, and, more specifically, to an apparatus and method for improving the service lifer and efficiency of such systems.

Fuel cell technology has been incorporated in vehicles ranging from automobiles and buses to forklift trucks. While vehicles using fuel cell propulsion systems may produce low to near-zero emissions, incorporating fuel cell systems into such vehicles typically increases a cost of the vehicle (both in initial cost as well as in operating costs due to a relatively short service life of the fuel cell system) and reduces the range the vehicles may travel. Accordingly, acceptance of fuel cell technology vehicles has generally been limited in the marketplace.

Typically, fuel cell propulsion systems are sized to meet the peak transient requirements for system operation. In a fuel cell vehicle, peak transients generally occur over periods of steep acceleration, during which the system draws significantly more power from the fuel cell than during periods where the vehicle moves at constant speed. Sizing fuel cells to meet peak power requirements during periods of steep acceleration may result in vehicles which have fuel cells that are significantly larger than desired for the majority of driving situations.

Developing fuel cell vehicles with single fuel cells designed to meet the maximum power demand requirements, typically results in fuel cells that are expensive, heavy, and that have a short service life. Because the service lifetime of a fuel cell generally decreases as the total number of transients experienced by the fuel cell increases, having a single large cell may result in frequent replacement of one of the most expensive components in the vehicle. Because the cost of replacing a fuel cell can be a large percentage of the vehicle's total operating costs, decreasing the size of fuel cells and increasing the service life of the fuel cell are two factors in reducing the overall cost of operation of fuel cell vehicles.

It would therefore be desirable to have a fuel cell propulsion system that reduces the number of transients experienced by the fuel cell. It would also be desirable to have a propulsion system in which the size and cost of the fuel cell can be reduced from levels typical for current propulsion systems while offering performance comparable to systems having larger fuel cells.

BRIEF DESCRIPTION OF THE INVENTION

According to an aspect of the invention, a drive circuit comprising a DC bus configured to supply power to a load, a first fuel cell coupled to the DC bus and configured to provide a first power output to the DC bus, and a second fuel cell coupled to the DC bus and configured to provide a second power output to the DC bus supplemental to the first fuel cell. The drive circuit further includes an energy storage device coupled to the DC bus and configured to receive energy from the DC bus when a combined output of the first and second fuel cells is greater than a power demand from the load, and provide energy to the DC bus when the combined output of the first and second fuel cells is less than the power demand from the load.

In accordance with another aspect of the invention, a method of manufacturing that includes configuring a DC link to provide electrical power to a traction motor, the traction motor having a loading on the DC link, coupling a first fuel cell and a second fuel cell to the DC link, each fuel cell configured to output electrical power to the DC link, and coupling a first energy storage device to the DC link, the first energy storage device configured to receive energy from the DC link when a combined power output of the first and second fuel cells is greater than a power demand from a loading and configured to provide energy to the DC link when the combined output of the first and second fuel cells is less than the power demand from the loading.

In accordance with another aspect of the invention, a fuel cell propulsion system including a first fuel cell configured to output power to a vehicle traction motor load, a second fuel cell configured to output power to the vehicle traction motor load, and an energy storage device configured to output power to the vehicle traction motor load. The system further includes a controller configured to regulate energy to and from the energy storage device such that the fuel cells provide energy to the energy storage device when combined power output from the fuel cells exceeds a power demand of the vehicle traction motor, and the energy storage device provides power to vehicle traction motor when combined power output from the fuel cells is less than the power demand of the vehicle traction motor.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

The invention includes embodiments that relate to hybrid and electric vehicles. The invention also includes embodiments that relate to an auxiliary drive apparatus and to methods for manufacturing auxiliary drive systems.

Figure 1:
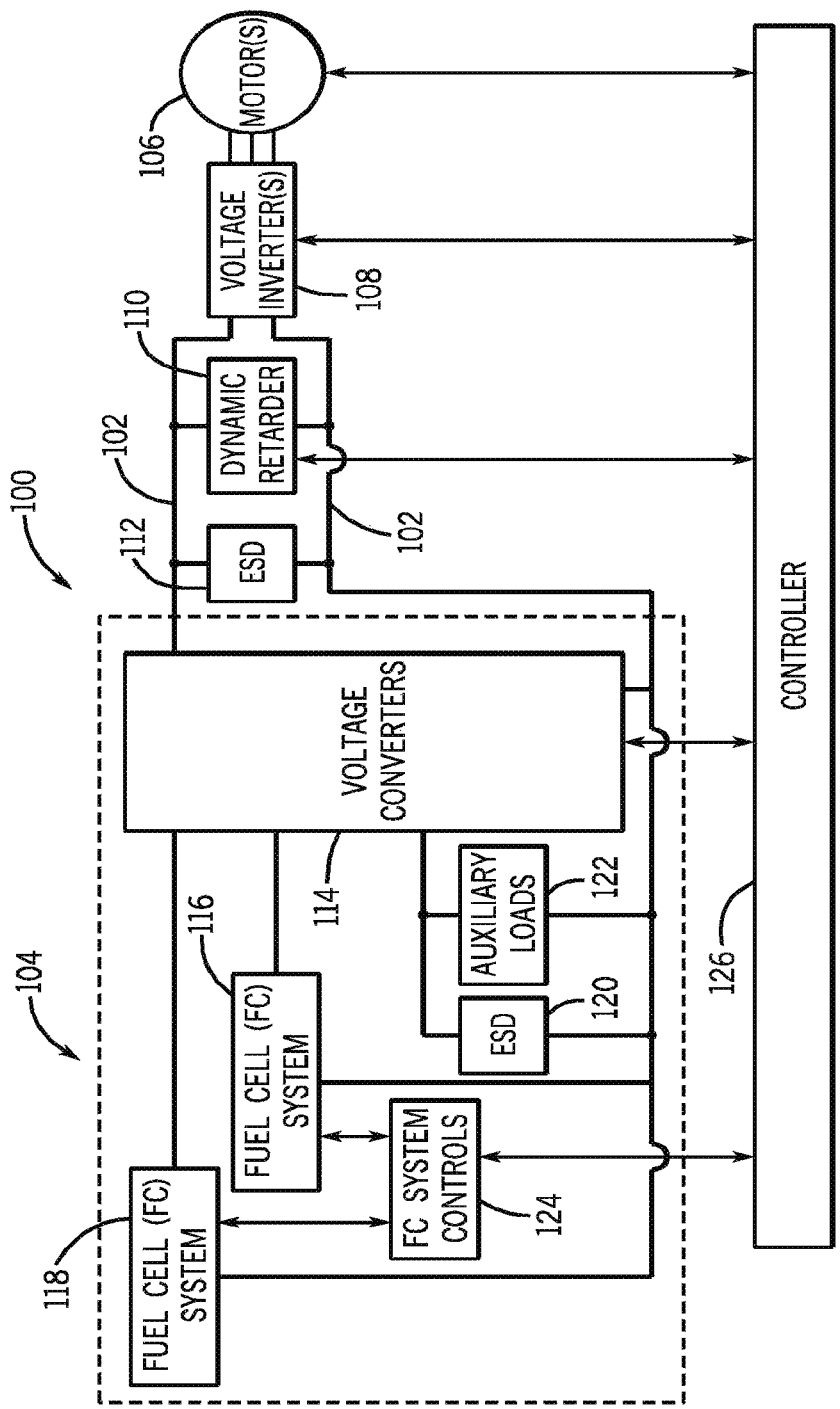
FIG. 1 is a block diagram illustrating a fuel cell propulsion system according to an embodiment of the invention.

According to an embodiment of the invention, a hybrid vehicle propulsion system 100 is illustrated in FIG. 1. Electrical power is provided to a DC bus or DC link 102 via a traction motor drive circuit 104. In this embodiment, a traction motor 106 is coupled to a voltage inverter 108, which is coupled to a dynamic retarder 110 via DC bus 102. A high-side energy storage device 112 is coupled to the retarder 110 via DC bus 102 as well. Traction motor drive circuit 104 includes one or more DC-to-DC voltage converters 114 that are coupled to fuel cells 116, 118, a low-side energy storage device 120, and auxiliary loads 122.

In embodiments of the invention, low side energy storage device 120 may be a battery, an ultracapacitor, a flywheel, or the like. In embodiments of the invention, voltage converters 114 may be a buck regulator, a buck converter, a boost regulator, a boost converter, or a bi-directional buck/boost converter. Fuel cells 116, 118 are coupled to fuel cell system controls 124. A controller 126 is coupled to fuel cell system controls 124, voltage converters 114, voltage inverter 108, dynamic retarder 110, and motor 106.

In operation, voltage inverter 108 receives a DC power signal provided by traction motor drive circuit 104 to DC bus 102 and converts the DC signal into an AC power signal suitable to drive traction motor 106, which may be configured to propel a hybrid vehicle (not shown). Traction motor drive circuit 104 generates a DC power signal via fuel cells 116, 118 and low-side energy storage device 120. The DC power signal is output to DC bus 102 via the one or more voltage converters 114. Dynamic retarder 110 is used during the recapture of electrical energy from traction motor 106 during braking. High-side energy storage device 112 is configured to supply electrical power to inverter 108 in one operating mode, during vehicle acceleration for example. In another operating mode, during regenerative braking for example, high-side energy storage device 112 may supply electrical power via the voltage converters 114 to low-side energy storage device 120, or to auxiliary loads 122.

Controller 126 regulates the output of both voltage inverter 108 and DC-to-DC voltage converters 114. Through its control of the output voltage of each of the voltage converters 114, controller 126 determines what proportion of the electrical energy driving traction motor 106 comes from each of the fuel cells 116, 118 and from low-side energy storage device 120. Controller 126 also regulates the operation of fuel cell control system 124, which is configured to implement on/off sequencing of fuels cells 116, 118 to extend the service life thereof while providing optimal efficiency independent of the instantaneous power demands of traction motor 106. While fuel cell control system 124 is depicted as a single element in FIG. 1, in an embodiment of the invention, each fuel cell 116, 118 has its own fuel cell controller, as discussed below and shown in FIG. 3. Furthermore, although only two fuel cells 116, 118 are illustrated, embodiments of the invention illustrated herein are not limited to two, but may include more than two fuel cells coupled to voltage converters 114 and controlled by fuel cell system control 124.

Figure 2:
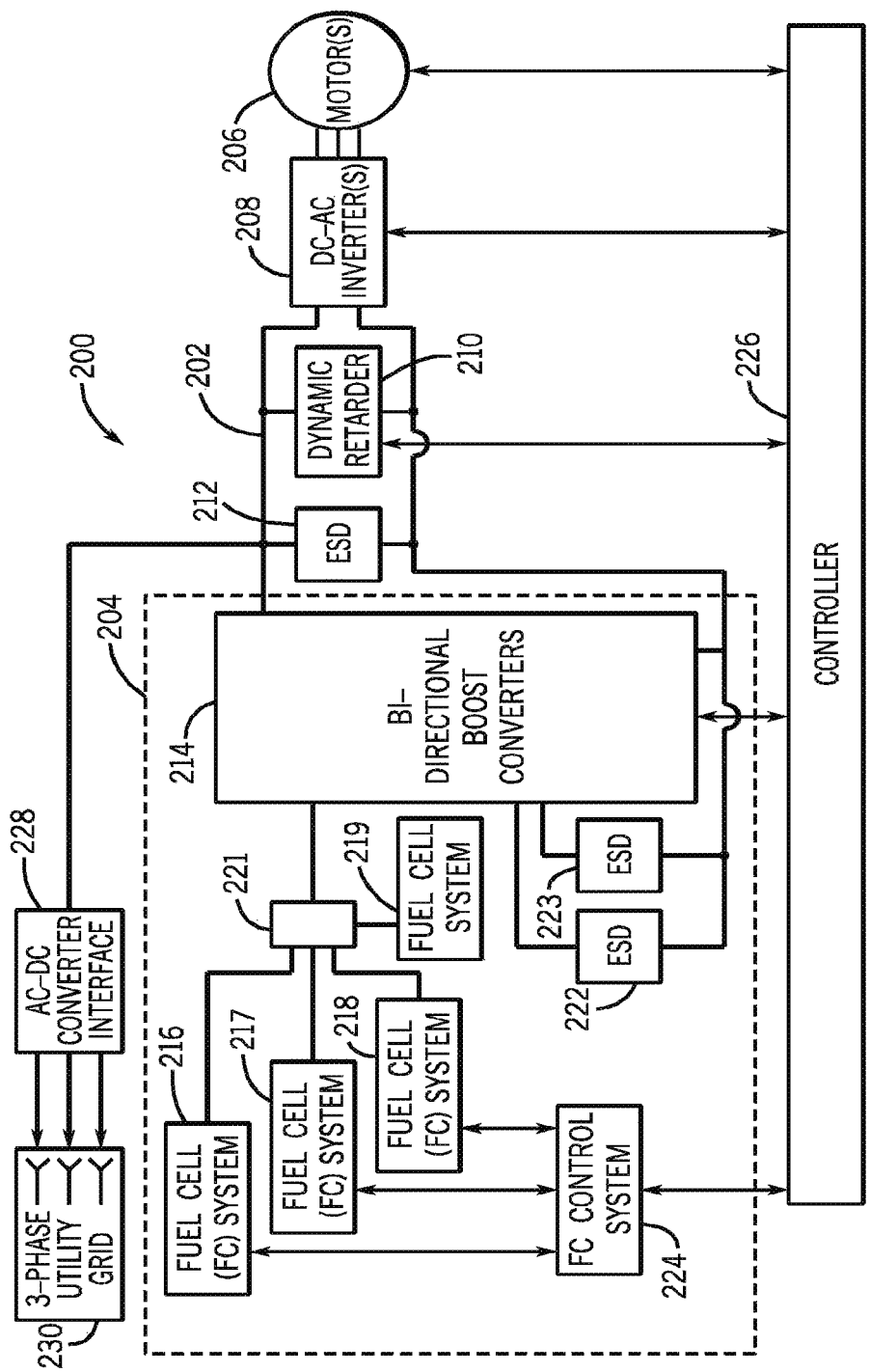
FIG. 2 is a block diagram illustrating a fuel cell propulsion system according to an embodiment of the invention.

FIG. 2 illustrates a hybrid vehicle propulsion system 200 according to an embodiment of the invention. System 200, in this embodiment, is a "plug-in" version configured to receive power from a utility grid 230. And, although illustrated with respect to FIG. 2, it is to be understood that the hybrid systems disclosed herein may all be configured to receive power from a utility grid, such as illustrated with respect to FIG. 2.

According to this embodiment of the invention, hybrid vehicle propulsion system 200 includes a traction motor drive circuit 204, which provides electrical power to a DC bus or DC link 202. In this embodiment, a traction motor 206 is coupled to a voltage inverter 208. A dynamic retarder 210 is also coupled to inverter 208 via DC bus 202. A high-side energy storage device 212, which may be one of a battery and an ultracapacitor, is coupled to dynamic retarder 210 via DC bus 202 as well. Traction motor drive circuit 204 comprises one or more bi-directional boost converters 214 that are coupled to fuel cells 216, 217, 218, 219, and to low-side energy storage devices 222, 223. The fuel cells 216, 217, 218, 219 are coupled to the boost converters 214 via a plurality of coupling devices 221, each of which may be a diode, a contactor, a semiconductor switch, or the like.

In embodiments of the invention, low-side energy storage device 222 may be one of a battery, an ultracapacitot, and a flywheel. Fuel cells 216, 217, 218, and 219 are coupled to fuel cell system controls 224, A controller 226 is coupled to fuel cell system controls 224, boost converters 214, and inverter 208. An AC-to-DC converter 228 is coupled between high-side energy storage device 212 and three-phase utility grid 230.

In operation, an AC signal from grid 230 is converted by an AC-to-DC converter 228 into a DC signal, the energy from which can be stored in high-side energy storage device 212, low-side energy storage device 222, low-side energy storage device 223, or a combination thereof in one embodiment, each of the plurality of fuel cells 216-219 is coupled to a distinct bi-directional buck/boost converter of bi-directional buck/boost converters 214, forming pairs thereof. In this embodiment, the plurality of fuel cells 216-219 may be regenerative or non-regenerative. In an embodiment where fuel cells 216-219 are regenerative fuel cells, bi-directional buck/boost converters 214 permit recharging of fuel cells 216-219 during regenerative braking. The plurality of coupling devices 221 in system 200 may include one coupling device for each fuel cell/bi-directional buck/boost converter pair. When the plurality of coupling devices 221 is a contactor or semiconductor switch, controller 226 can fully isolate a respective fuel cell 216-219 from the remainder of circuit 200. Electrical energy is thus supplied to traction motor 206 via bi-directional buck/boost converters 214, which are also configured to deliver electrical energy from traction motor 206 during regenerative braking to the low-side energy storage devices 222, 223.

In an embodiment of the invention, system 200 is employed in a multiple fuel cell vehicle. In such an embodiment, controller 226 is configured to operate fuel cells, such as fuel cells 216, 217, at a relatively non-varying power output in response to power demands from traction motor 206. This relatively stable output is maintained independent of the transient or varying power demands from traction motor 206 which may be due to different modes of vehicle operation. However, when there are no power demands on the fuel cells 216, 217, such as, for example, at a stop light, controller 226 may instruct fuel cells 216-219 to supply no power until the user accelerates the vehicle. In such a case, the power output from the fuel cells could be reduced. In order for fuel cells 216, 217 to maintain a non-varying output independent of the varying power demands from traction motor 206, the output level of fuel cells 216, 217 should be at or below the minimum power level used during vehicle operation.

During periods of acceleration or when climbing a steep hill, traction motor 206 may demand power in excess of that being supplied by fuel cells 216, 217. Such sharp increases or variances in power demand may be referred to as transients and can reduce service life of the fuel cell. Because fuel cells 216, 217 maintain relatively non-varying power outputs, power demands in excess of that supplied by fuel cells 216, 217, including transient or varying power demands, are met by additional fuel cells, for example 218, 219, along with low-side energy storage devices 222, 223 and high-side energy storage device 212. In this manner, fuel cell service lifetimes are extended because fuel cells 216, 217 are not exposed to transient demands. And while fuel cells 218, 219 supply the supplemental power needed during transient demands, these cells may not have to supply energy when the vehicle operates in a low-demand mode, such as cruising at constant speed or driving at low-speed.

Operating the fuel cells in this manner may also be more economical in that the fuel cells can be smaller than would be possible in a vehicle powered only by a single fuel cell. For example, a single fuel cell vehicle may, at times of peak demand, use 150 kW of power. In this case, the single fuel cell would have to be capable of supplying the 150 kW. As such, the fuel cell could be large and costly to operate and replace and would be exposed to transient power demands, thus limiting the service lifetime of the fuel cell. However, a fuel cell propulsion system according to an embodiment of the invention may include a fuel cell of 40 kW providing a relatively stable or non-varying power output adequate for low-power-demand operating modes. Controller 226 is configured to meet transient power demands using one or more energy storage devices, such as storage devices 212, 222, 223, and using one or more fuel cells, such as fuel cells 218, 219 to supply supplemental power. Controller 226 could alternate between the two supplemental fuel cells 218, 219 in responding to transient power demands, thus extending the service life of each cell. Cost savings may be realized through both a longer service life for fuel cells and through the use of smaller, less costly fuel cells.

Figure 3:
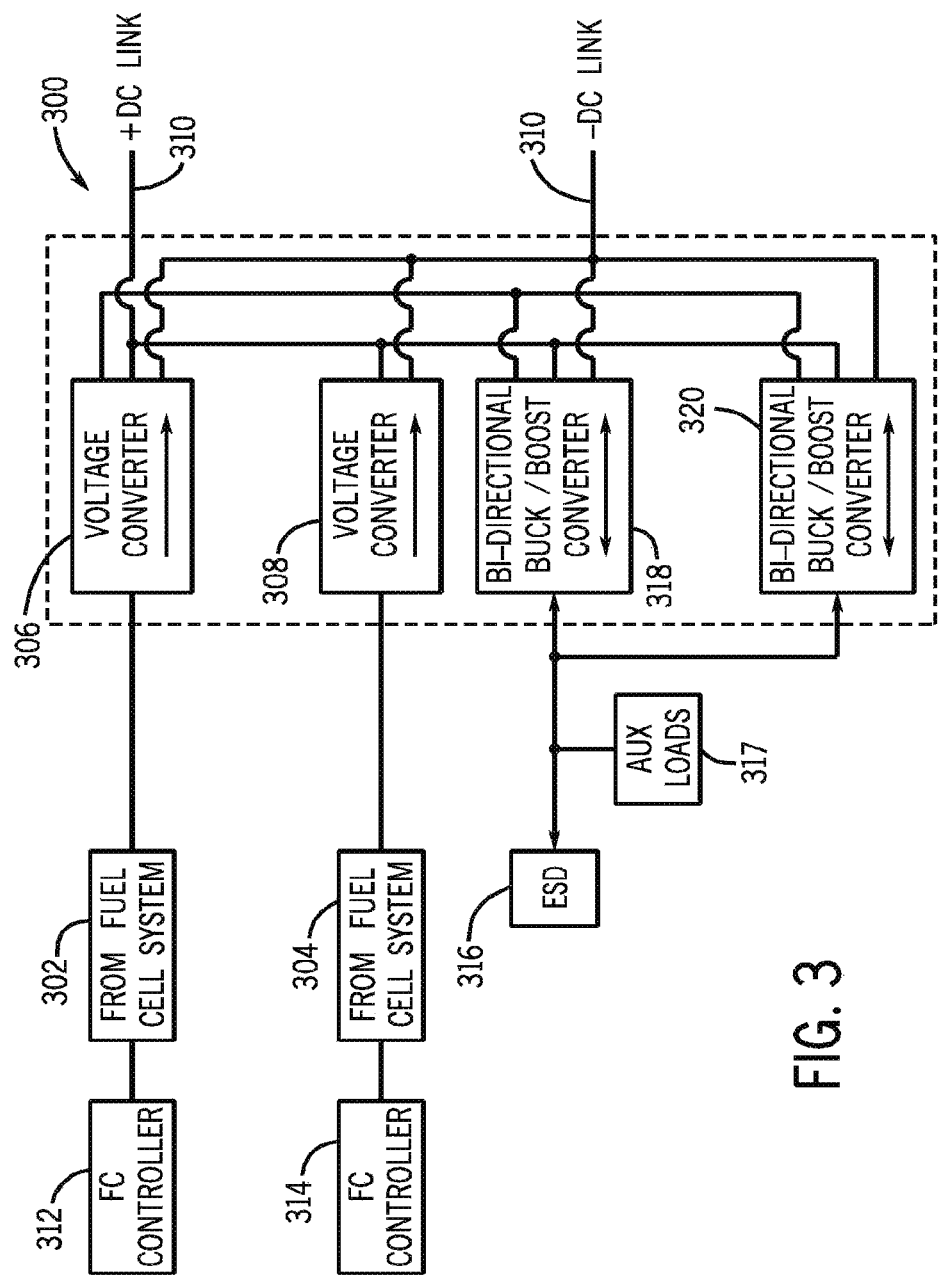
FIG. 3 is a block diagram illustrating a drive circuit usable in the system of FIG. 1.
Figure 6:
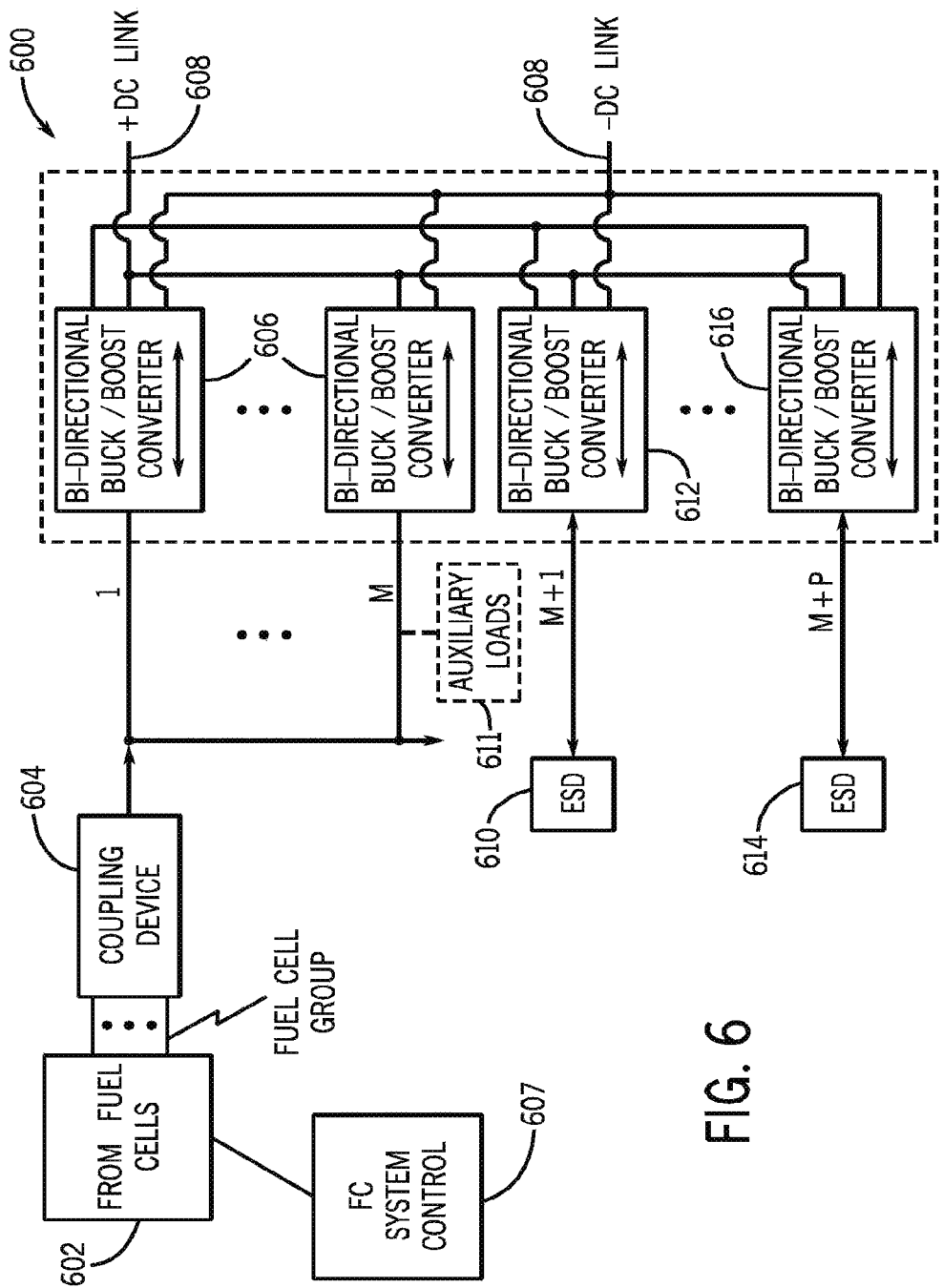
FIG. 6 is a block diagram illustrating a drive circuit usable in the system of FIG. 2 with alternate boost converter configuration.
Figure 7:
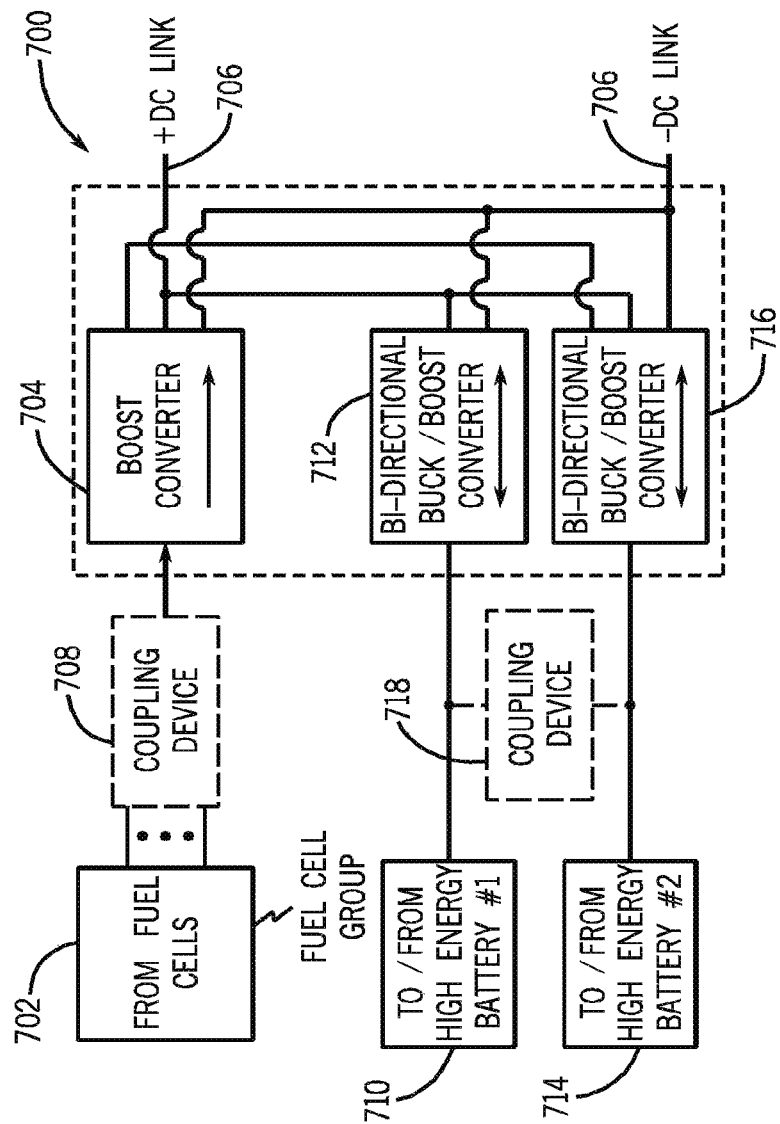
FIG. 7 is a block diagram illustrating a drive circuit usable in the system of FIG. 2.

FIGS. 3, 6, and 7 illustrate traction motor drive circuits 300, 600, 700, respectively, according to embodiments of the invention. Thus, circuits 300, 600, 700 may be applicable to the hybrid vehicle propulsion system 100 illustrated in FIG. 1 or to the "plug-in" version of a hybrid vehicle propulsion system 200 illustrated in FIG. 2.

An embodiment of a traction motor drive circuit 300 is illustrated in FIG. 3 and includes two fuel cells 302, 304, each of which is coupled to a respective DC-to-DC voltage converter 306, 308. Each of DC-to-DC voltage converters 306, 308 may be one of a uni-directional boost converter and a bi-directional buck/boost converter. Uni-directional boost converters would not supply recharging voltage to fuel cells 302, 304 when, for example, fuel cells 302, 304 are non-regenerative-type cells. In this case, using uni-directional boost converters may provide a cost advantage over bi-directional voltage converters.

DC-to-DC voltage converters 306, 308 are coupled to DC bus/DC link 310. Each fuel cell 302, 304 is coupled to a respective fuel cell controller 312, 314. An energy storage device 316, which may be one of a battery, an ultracapacitor, and a flywheel, is coupled to two bi-directional buck/boost converters 318, 320, both of which are coupled to DC bus 310. Auxiliary loads 317 may also be electrically connected to energy storage device 316, and receive power from energy storage device 316 or from DC link through one or more bi-directional buck/boost converters 318, 320 Though only two fuel cells 302, 304, two fuel cell controllers 312, 314, and two DC-to-DC voltage converters 306, 308 are illustrated, one skilled in the art will recognize that embodiments of system 300 may include more than two fuel cells, fuel controllers and voltage converters. Accordingly, one skilled in the art will recognize that embodiments of system 300 may include more than two bi-directional buck/boost converters 318, 320, with each of the more than two bi-directional buck/boost converters coupled to DC bus 112 and energy storage device 316.

Power output of fuel cells 302, 304 is controlled by fuel cell controllers 312, 314, respectively. Together, the individual fuel cell controllers constitute a fuel cell control system, such as fuel cell control system 224 shown in FIG. 2. In operation, each of the DC-to-DC voltage converters 306, 308 boosts the voltages from fuel cells 302, 304 when commanded by controllers 312, 314 and supplies the boosted voltage to DC bus/link 310. Similarly, when commanded to do so by controller 226, bi-directional buck/boost converters 318, 320 boosts the voltage from energy storage device 316 and supplies the boosted voltage to DC bus 310.

The level to which the output voltages of fuel cell 302, 304 are boosted, or stepped up, depends on the manner in which DC-to-DC voltage converters 306, 308 are regulated by controller 226. Similarly, the level to which the output voltage of energy storage device 316 is boosted depends on the manner in which bi-directional buck/boost converters 318, 320 are regulated by controller 226.

Figure 4:
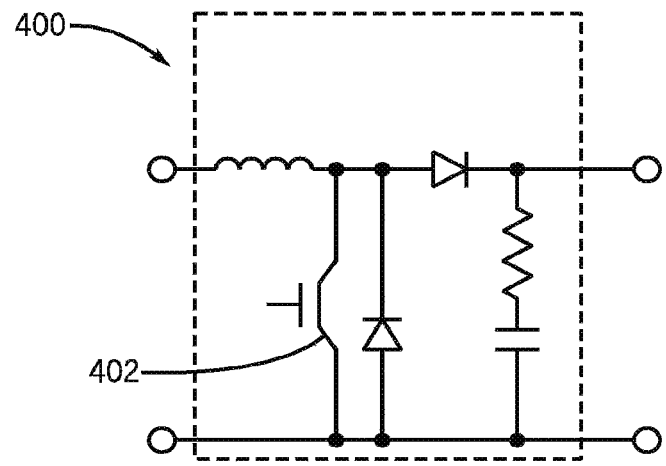
FIG. 4 is a schematic diagram illustrating an embodiment of a boost converter.

FIG. 4 illustrates an exemplary boost converter 400 usable in embodiments of boost converters herein. Boost converter 400 has a transistor or switch 402 used to control the output voltage of the device 400. In an embodiment of the invention, a controller such as controller 226 (shown in FIG. 2) opens and closes switch 402 using pulse-width modulation (PWM) to generate the desired output voltage. Pulse-width modulation of a power supply, such as fuel cell 302 (shown in FIG. 3) and DC-to-DC voltage converter 306 (shown in FIG. 3), involves modulation of the power supply duty cycle. The resulting output is a series of square waves. By controlling the timing of the square waves, the power supply output signal can be made to simulate a range of DC voltage values.

Figure 5:
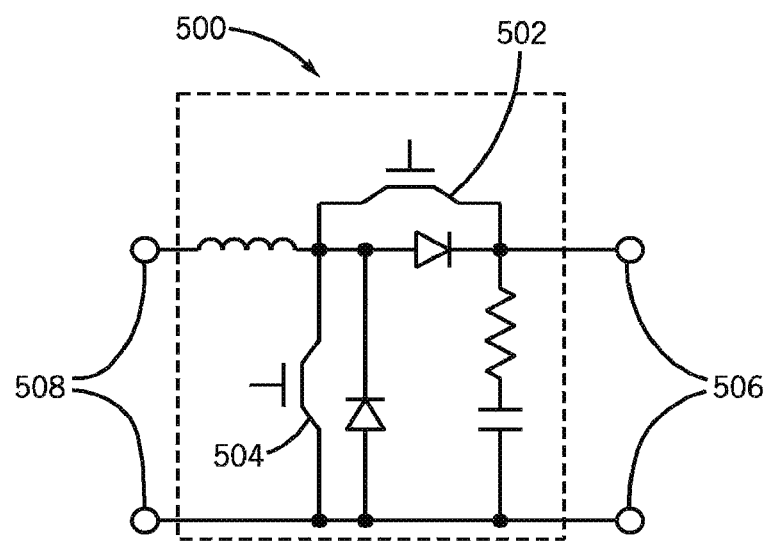
FIG. 5 is a schematic diagram illustrating an embodiment of a bi-directional buck/boost converter.

FIG. 5 shows an exemplary bi-directional buck/boost converter 500 usable in embodiments of bi-directional buck/boost converters herein. Bi-directional buck/boost converter 500 has two transistor or switches 502, 504 used to control the output voltage of the device. In an embodiment of the invention, controller 226 (shown in FIG. 2) operates the transistors 502, 504 using PWM to generate the desired output voltage. Power can flow in both directions through converter 500. However, the output voltage can be boosted only in one direction, that is, when power is output at a first terminal 506. For power flowing in the other direction and output to a second to 508, bi-directional converter 500 acts as a buck, or step-down, converter.

FIG. 6 illustrates an embodiment of a traction motor drive circuit 600 in which a plurality of fuel cells 602 is coupled to a coupling device 604. In an alternate embodiment of invention, circuit 600 includes one coupling device for each of the plurality of fuel cells 602. The combined output of the plurality of fuel cells 602 is coupled through coupling device 604 to a plurality of bi-directional buck/boost converters 606. In an alternate embodiment of the invention, the combined output of the plurality of fuel cells 602 is also electrically coupled through coupling device 604 to auxiliary loads 611 (shown in phantom). Auxiliary loads 611 can be powered directly from fuel cells 602 or via bi-directional buck/boost converters 606 using power from DC Link 608. Fuel cells 602 are also coupled to fuel cell control system 607, which, in an embodiment of the invention, includes a separate fuel cell controller (not shown) for each of the plurality of fuel cells 602. Each of the plurality of bi-directional buck/boost converters 606 is coupled to DC link or bus 608, A first energy storage device 610, which may be a battery or an ultracapacitor, is coupled to a first bi-directional buck/boost converter 612. A second energy storage device 614, which may be a battery, an ultracapacitor, or a flywheel, is coupled to a second bi-directional buck/boost converter 616. First and second bi-directional buck/boost converters 612, 616 are coupled to DC bus 608. One skilled in the art will recognize that circuit 600 is not limited to two energy storage devices but may include a plurality of energy storage devices coupled to one or more bi-directional buck/boost converters.

The use of bi-directional buck/boost converters 606 allows for recharging of regenerative-type fuel cells 602 during regenerative braking. Similarly, bi-directional buck/boost converters 612, 616 allow for recharging of energy storage devices 610, 614 during regenerative braking. Having multiple energy storage devices 610, 614 may increase the amount of electrical energy available to devices powered from DC bus 608. However, the amount of electrical energy supplied to DC bus 608 via energy storage devices 610, 614 is determined by the manner in which the voltage output of each of bi-directional buck/boost converters 612, 616 is regulated.

Bi-directional buck/boost converters 606 step up the voltage output from the plurality of filet cells 602 and supply the stepped up voltage to DC bus 608. Similarly, bi-directional buck/boost converters 612, 616 step up the voltages from energy storage devices 610, 614 and supplies the stepped up voltages to DC bus/DC link 608. The amount of electrical energy output by fuel cells 602 is determined by the manner in which fuel cell output is regulated by fuel cell control system 607. During low-speed driving or cruising at constant speed, fuel cell control system 607 may be commanded to operate a subset of the plurality of fuel cells 602 to output power at a non-varying rate to propel the vehicle. During periods of acceleration, when more power is needed, circuit 600 may meet the transient power demands by drawing supplemental power from energy storage devices 610, 614 and from fuel cells 602.

FIG. 7 illustrates a traction motor drive circuit 700 according to an embodiment of the invention. Traction motor drive circuit 700 includes a plurality of fuel cells 702 whose combined output is coupled to a boost converter 704 coupled to DC link 706. In an alternate embodiment of circuit 700, each of the plurality of fuel cells 702 is coupled to a coupling device 708 (shown in phantom), which may be a semiconductor switch, a diode, a contactor, or the like. A first energy storage device 710 is coupled to a first bi-directional buck/boost converter 712, and a second energy storage device 714 is coupled to a second bi-directional hock/boost converter 716. Each of the first and second energy storage devices 710, 714 may be a battery, an ultracapacitor, or a flywheel. Each of the first and second bi-directional buck/boost converters 712, 716 is coupled to DC link 706.

In operation, the output voltage of the plurality of fuel cells 702 is stepped up by boost converter 704 and output to DC link 706. Similarly, the output voltages of storage devices 710, 714 are boosted by converters 712, 716, respectively, and supplied to DC bus 706. In an alternate embodiment, a contactor- or switch-type coupling device 708 may be operated to isolate the plurality of fuel cells 702 from the remainder of circuit 700. Alternate embodiments may also include a coupling device 718 (shown in phantom) coupled between the outputs of first energy device 710 and second energy device 714. Coupling device 718 could be used to recharge one energy storage device by a second energy storage device. For example, if first energy storage device 710 is a battery and second energy storage device 714 is an ultracapacitor, the battery 710 could supply the ultra-capacitor 714 with electrical energy via coupling device 718.

Figure 8:
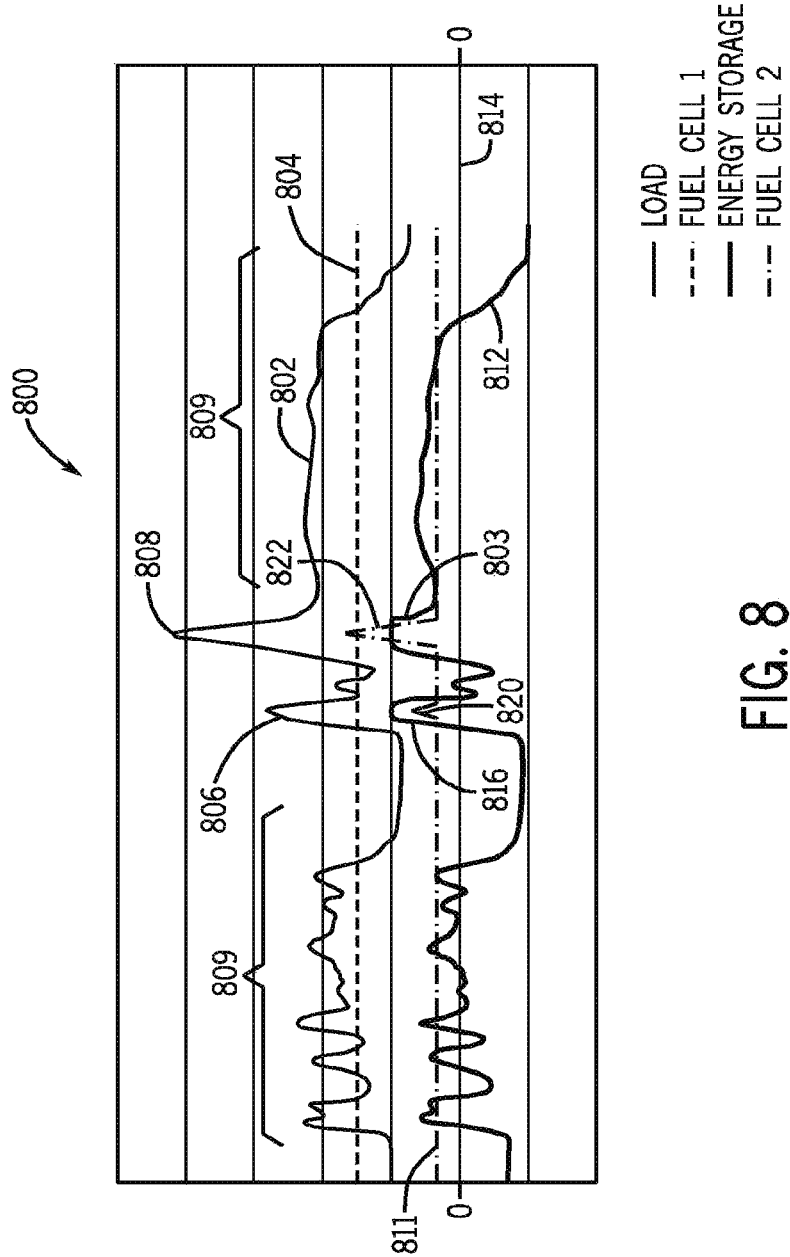
FIG. 8 is a graphical illustration of power output of energy storage elements in a fuel cell propulsion system according to an embodiment of the invention.

FIG. 8 is a graphic illustration of a power output plot 800 of an exemplary hybrid vehicle propulsion system having two fuel cells, a battery, and a load such as an electric motor according to embodiments of the invention. A power demand curve 802 illustrates an exemplary power demand of the electric motor. A plurality of curves 804 and 811 respectively illustrate power provided by first and second fuel cells. An energy storage device power curve 812 illustrates power output by an energy storage device such as, for example, a battery.

The first fuel cell is operated to experience minimum transients, and the second fuel cell is operated to experience transients when limits of the energy storage device have been reached according to embodiments of the invention. As illustrated, first fuel cell power 804 is stable or non-varying despite the transiently varying power demand 802. Second fuel cell power 811 is stable during periods when the electric motor power demand 802 is less than the combined power outputs of first fuel cell 804, second fuel cell 811, and battery power 812 such as during period 809. During period 809, the power demand 802 is variable, and at times exceeds the total output of the first and second fuel cells 804, 811, and at other times is less than the total output of the first and second fuel cells 804, 811. When the power demand is less than the combined power output of the first and second fuel cells 804, 811, output 812 from the battery is not needed, and the excess fuel cell energy charges the battery. As illustrated in FIG. 8, when battery power 812 drops below a zero axis 814, the battery may absorb excess power from the first and second fuel cells.

At times during operation, power demand 802 may experience spikes 806, 808 that exceed the stable output of both fuel cells 802, 811 and battery 812. For example, battery power output 812 may be limited by the physical properties of the battery as illustrated by plateaus 803, 816. Under such occurrences of spikes 806, 808, when battery power 812 reaches maximum battery output 803, 816, power output of the second fuel cell transiently increases, respectively, at 820 and 822 to meet the additional power demand.

Thus, because the battery initially responds to transient power demands exceeding the stable power outputs of the two fuel cells, the second fuel cell responds to transient demands that exceed the combined stable power outputs of the two fuel cells and the power output of the battery. Reducing exposure of the second fuel cell to transient power demands when limits of the battery have been reached increases the service life of the second fuel cell. Further, because the first fuel cell does not respond to power demand transients such as at spikes 806, 808, the first fuel cell has a longer service life and, further, does not have to be sized to meet power demands greater than the stable output 804.

Figure 9:
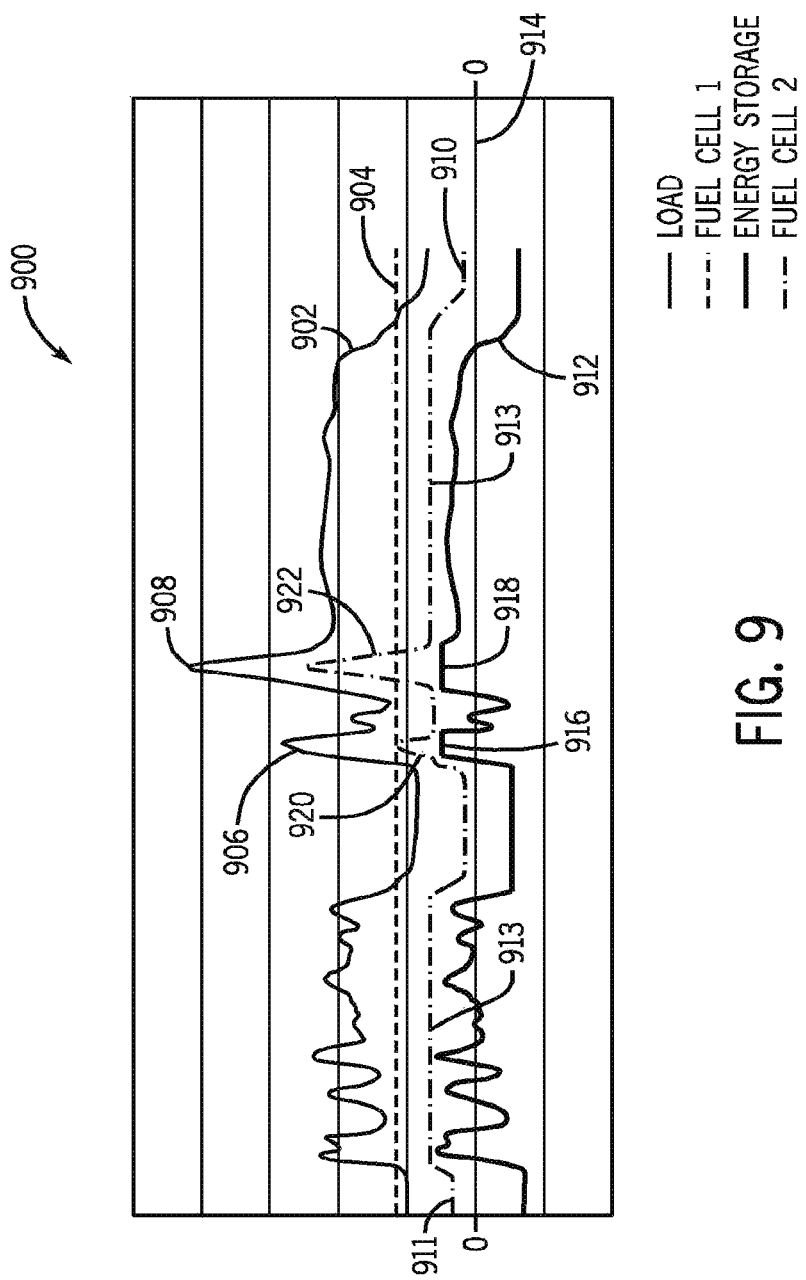
FIG. 9 is a graphical illustration of power output of energy storage elements in a fuel cell propulsion system according to an embodiment of the invention.

FIG. 9 is a graphic illustration 900 of power output of an exemplary hybrid vehicle propulsion system having two fuel cells, a battery and a load, such as an electric motor, according to embodiments of the invention. That illustrated in FIG. 9 is similar to that illustrated in FIG. 8. However, in this embodiment the maximum power output of the battery is halved and the second fuel cell is caused to experience greater transient fluctuations under the same assumed loading conditions.

Referring now to FIG. 9, a power output plot 900 is illustrated according to an embodiment of the invention. Power output plot 900 shows a power demand curve 902 similar to power demand curve 802 shown in FIG. 8. A power output curve 904 of a first fuel cell shows stable or non-varying power output despite varying power demands of the electric motor 902. A power output curve 910 is plotted of a second fuel cell having half the power output of the second fuel cell used for output curve 811 illustrated in FIG. 8. An energy storage device or battery power curve from 912 illustrates power output by, for example, a battery having half the power output of the battery used for output curve 802 illustrated in FIG. 8. Curve 910 shows a non-zero base power output 911 that is stable while the electric motor power demand from curve 902 is less than the stable power output of the first fuel cell 904. Curve 910 shows another non-zero base power output 913 that is stable while the electric motor power demand from curve 902 is greater than the stable power output of the first fuel cell 904 and while the electric motor power demand from curve 902 is less than a maximum battery power output as illustrated by plateaus 916, 918 of curve 912.

Because the battery, in this embodiment, has half the power output of that used in FIG. 8, the second fuel cell is operated to respond to more transient demands than under the same load conditions as those illustrated in FIG. 8 such that the first fuel cell experiences minimum transients. When the electric motor power demand 902 is less than the combined power output of the first and second fuel cells 904, 910, the excess fuel cell energy charges the battery as illustrated when battery power output line 912 drops below the zero axis 914 on graph 900, which indicates that the battery is absorbing excess power from the first and second fuel cells. The battery power output 912 adds supplemental power to the first and second fuel cell power outputs 904, 910 when the power demand 902 exceeds the power output 904 of the first fuel cell and the base power output 913 of the second fuel cell. When the battery output reaches its maximum shown at 916, 918, the power output of the second fuel cell increases at 920, 922 to meet the power demanded at 906, 908. Because the battery initially responds to transient demands exceeding the stable power outputs of the two fuel cells, the responses of the second fuel cell to transient power demands are reduced. However, because the battery power output maximum is less than that illustrated in FIG. 8, the transient response requirements of the second fuel cell are increased.

Thus, between the two illustrations of FIGS. 8 and 9, one skilled in the art will recognize that a tradeoff may be made between battery capacity and transient requirements of the second fuel cell. A large battery capacity may reduce or eliminate the transient requirements of the fuel cell under designated operating conditions. However, it does so at the expense of a larger and more expensive battery. Conversely, a smaller battery capacity may result in increased transient requirements of the second fuel cell, thus negatively impacting its life. As such, the up-front cost of a large battery may be used to offset the long-tenet life costs of a fuel cell, and vice versa, according to embodiments of the invention.

According to one embodiment of the invention, a drive circuit comprising a. DC bus configured to supply power to a load, a first fuel cell coupled to the DC bus and configured to provide a first power output to the DC, bus, and a second fuel cell coupled to the DC bus and configured to provide a second power output to the DC bus supplemental to the first fuel cell. The drive circuit further includes an energy storage device coupled to the DC bus and configured to receive energy from the DC bus when a combined output of the first and second fuel cells is greater than a power demand from the load, and provide energy to the DC bus when the combined output of the first and second fuel cells is less than the power demand from the load.

In accordance with another embodiment of the invention, a method of manufacturing that includes configuring a DC link to provide electrical power to a traction motor, the traction motor having a loading on the DC link, coupling a first fuel cell and a second fuel cell to the DC link, each fuel cell configured to output electrical power to the DC link, and coupling a first energy storage device to the DC link, the first energy storage device configured to receive energy from the DC link when a combined power output of the first and second fuel cells is greater than a power demand from a loading and configured to provide energy to the DC link when the combined output of the first and second fuel cells is less than the power demand from the loading.

In accordance with yet another embodiment of the invention, a fuel cell propulsion system including a first fuel cell configured to output power to a vehicle traction motor load, a second fuel cell configured to output power to the vehicle traction motor load, and an energy storage device configured to output power to the vehicle traction motor load. The system further includes a controller configured to regulate energy to and from the energy storage device such that the fuel cells provide energy to the energy storage device when combined power output from the fuel cells exceeds a power demand of the vehicle traction motor, and the energy storage device provides power to vehicle traction motor when combined power output from the fuel cells is less than the power demand of the vehicle traction motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel cell propulsion system comprising:
    a traction motor;
    a voltage converter assembly coupled to the traction motor, the voltage converter assembly comprising a plurality of boost converters and a buck/boost converter;
    a fuel cell assembly coupled to the plurality of boost converters;
    an energy storage device coupled to the buck/boost converter; and
    a control system configured to selectively:
        operate the plurality of boost converters to deliver a first power output to the traction motor;
        operate the plurality of boost converters to deliver a second power output to the traction motor; and
        operate the buck/boost converter to deliver a third power output to the traction motor.
2. The fuel cell propulsion system of claim 1, wherein the energy storage device comprises one of a battery, an ultracapacitor, and a flywheel.

3. The fuel cell propulsion system of claim 1, wherein the fuel cell assembly comprises a regenerative fuel cell.

4. The fuel cell propulsion system of claim 1, wherein the fuel cell assembly comprises a plurality of fuel cells.

5. The fuel cell propulsion system of claim 1, wherein the voltage converter assembly further comprises an inverter coupled to the traction motor.

6. The fuel cell propulsion system of claim 5, wherein the traction motor is an AC motor.

7. The fuel cell propulsion system of claim 1, further comprising an auxiliary load coupled to the energy storage device.

8. The fuel cell propulsion system of claim 1, further comprising an auxiliary load coupled to the fuel cell assembly.

9. The fuel cell propulsion system of claim 1, further comprising an AC/DC converter interface coupleable to an external charging source for charging the energy storage device.

10. The fuel cell propulsion system of claim 1, wherein the control system is further configured to operate the voltage converter assembly to charge the energy storage device from the fuel cell assembly.

11. The fuel cell propulsion system of claim 1, wherein the control system is further configured to operate the voltage converter assembly to charge the energy storage device via regenerative braking.

\* \* \* \* \*